(12) United States Patent
Chan et al.

(10) Patent No.: US 8,633,896 B2
(45) Date of Patent: Jan. 21, 2014

(54) COMMUNICATION DEVICE

(75) Inventors: Eric Chan, Toronto (CA); Orlin Vesselinov Stoev, Toronto (CA); Joshua Roland Lessard, Waterloo (CA)

(73) Assignee: BlackBerry Limited, Waterloo (CA)

( * ) Notice: Subject to any disclaimer, the term of this patent is extended or adjusted under 35 U.S.C. 154(b) by 431 days.

(21) Appl. No.: 12/968,652

(22) Filed: Dec. 15, 2010

(65) Prior Publication Data

US 2012/0154341 A1  Jun. 21, 2012

(51) Int. Cl.
*G09G 5/00* (2006.01)
(52) U.S. Cl.
USPC ............ 345/169; 345/168; 345/173; 345/594
(58) Field of Classification Search
USPC .......... 345/156–173, 594; 707/769, E17.005, 707/E17.014; 715/700–866; 455/406–413; 709/203, 206, 217
See application file for complete search history.

(56) References Cited

U.S. PATENT DOCUMENTS

| 2002/0083138 A1* | 6/2002 | Wilson et al. ................. 709/206 |
| 2002/0184395 A1* | 12/2002 | LeFevre et al. ............... 709/310 |
| 2004/0155901 A1 | 8/2004 | McKee et al. |
| 2006/0224966 A1 | 10/2006 | Bohn |
| 2007/0038959 A1 | 2/2007 | Bertram et al. |
| 2010/0011304 A1* | 1/2010 | van Os .......................... 715/762 |
| 2010/0205559 A1 | 8/2010 | Rose |
| 2010/0291898 A1* | 11/2010 | Sanding et al. ............... 455/411 |
| 2011/0125783 A1* | 5/2011 | Whale et al. .................. 707/769 |

OTHER PUBLICATIONS

Corresponding European Patent Application No. 10195273.7 Search Report mailed May 20, 2011.
Easing the Transition from EI6 to using Newer Browsers . . . [http://www.wait-till-i.com/2009/04/02/easing-the-transition-from-ie6-to-usingnewer-browsers/] Downloaded from the Internet on Mar. 18, 2011.
Icon Glossary for Software Updates [http://technet.microsoft.com/en-us/library/bb633260.aspx] Downloaded form the Internet on Mar. 18, 2011.
Tark (Temporary Bookmarks) 0.33 [http://www.dodownload.com/internet+network/browser+ext/tark+temporary+bookmarks+rollin+crittendon.html] Downloaded from the Internet on Mar. 18, 2011.

* cited by examiner

*Primary Examiner* — Hong Zhou
(74) *Attorney, Agent, or Firm* — Perry + Currier Inc.; Kristjan Spence

(57) ABSTRACT

According to embodiments described in the specification, a method and apparatus for controlling the display of a mobile electronic device are provided. The mobile electronic device comprises a display; a memory for storing a first application, a first identifier identifying the first application and a second identifier for identifying a second application; and, a processor interconnected with the display and the memory, the processor configured to control the display to generate a launch interface comprising a representation of the second identifier for launching the first application.

19 Claims, 9 Drawing Sheets

COMMUNICATION DEVICE

FIELD

The specification relates generally to mobile electronic devices, and specifically to a method, system and apparatus for controlling a display of a mobile electronic device.

BACKGROUND

As mobile electronic devices become more powerful, the functionality provided by such devices continues to expand and improve. However, the resources of mobile electronic devices remain limited in comparison to other devices such as mains-powered desktop computers. The presence of an application on a mobile electronic device which replaces another application can lead to inefficient use of the device's limited resources.

BRIEF DESCRIPTIONS OF THE DRAWINGS

Embodiments are described with reference to the following figures, in which.

DETAILED DESCRIPTION OF THE EMBODIMENTS

According to an aspect of the specification, a mobile electronic device is provided, comprising: a display; a memory for storing a first application, a first identifier identifying the first application and a second identifier for identifying a second application; and, a processor interconnected with the display and the memory, the processor configured to control the display to generate a launch interface comprising a representation of the second identifier for launching the first application.

According to another aspect of the specification, a method is provided for controlling the display of a mobile electronic device, the method comprising: storing, in a memory of the mobile electronic device, a first application, a first identifier identifying the first application and a second identifier for identifying a second application; and controlling a display of the mobile electronic device to generate a launch interface comprising a representation of the second identifier for launching the first application.

According to a further aspect of the specification, a non-transitory computer-readable medium is provided for storing computer-readable instructions executable by a processor. The computer-readable instructions implement the above method.

Figure 1:
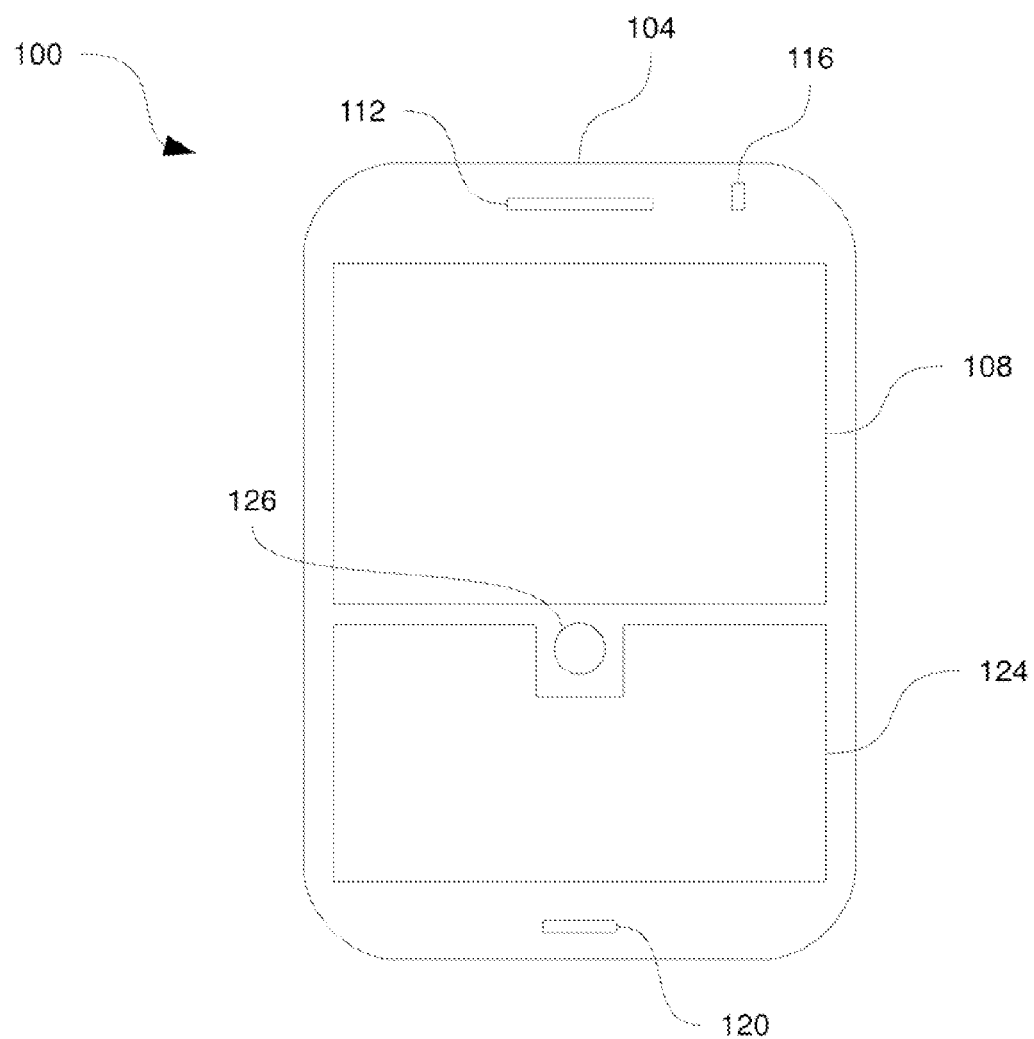
FIG. 1 depicts a mobile electronic device, according to a non-limiting embodiment.

FIG. 1 depicts a mobile electronic device 100, which in the present embodiment is based on the computing environment and functionality of a hand-held wireless communication device, such as a smart phone. Mobile electronic device 100, however, is not limited to a smart phone. Other mobile electronic devices are also contemplated, such as tablet computers, cellular telephones, Personal Digital Assistants ("PDAs"), media or MP3 players, laptop computers and the like.

Mobile electronic device 100 includes a housing 104 which supports the other components of mobile electronic device 100. Housing 104 can be constructed of any suitable material, or combination of materials, including without limitation plastics (e.g. Polycarbonate/Acrylonitrile Butadiene Styrene ("PC/ABS")) and metals (e.g. aluminum).

Mobile electronic device 100 also includes one or more output devices, including without limitation a display 108, a speaker 112 and a Light Emitting Diode ("LED") indicator 116. Mobile electronic device 100 additionally includes one or more input devices, including without limitation a microphone 120, a keypad 124 (which, in some non-limiting embodiments, can include a QWERTY keyboard and one or more additional function keys) and a trackball 126. It will now be apparent that in some embodiments (not shown), other combinations of input and output devices can be provided. In some non-limiting embodiments, for example, trackball 126 can be replaced with a track pad (not shown). In further non-limiting embodiments, one or both of keypad 124 and trackball 126 can be omitted, and a touch screen input device can be integrated with display 108. In still other embodiments, the touch screen input device can be provided in addition to keypad 124 and trackball 126. Further combinations and variations will occur to those skilled in the art.

Figure 2:
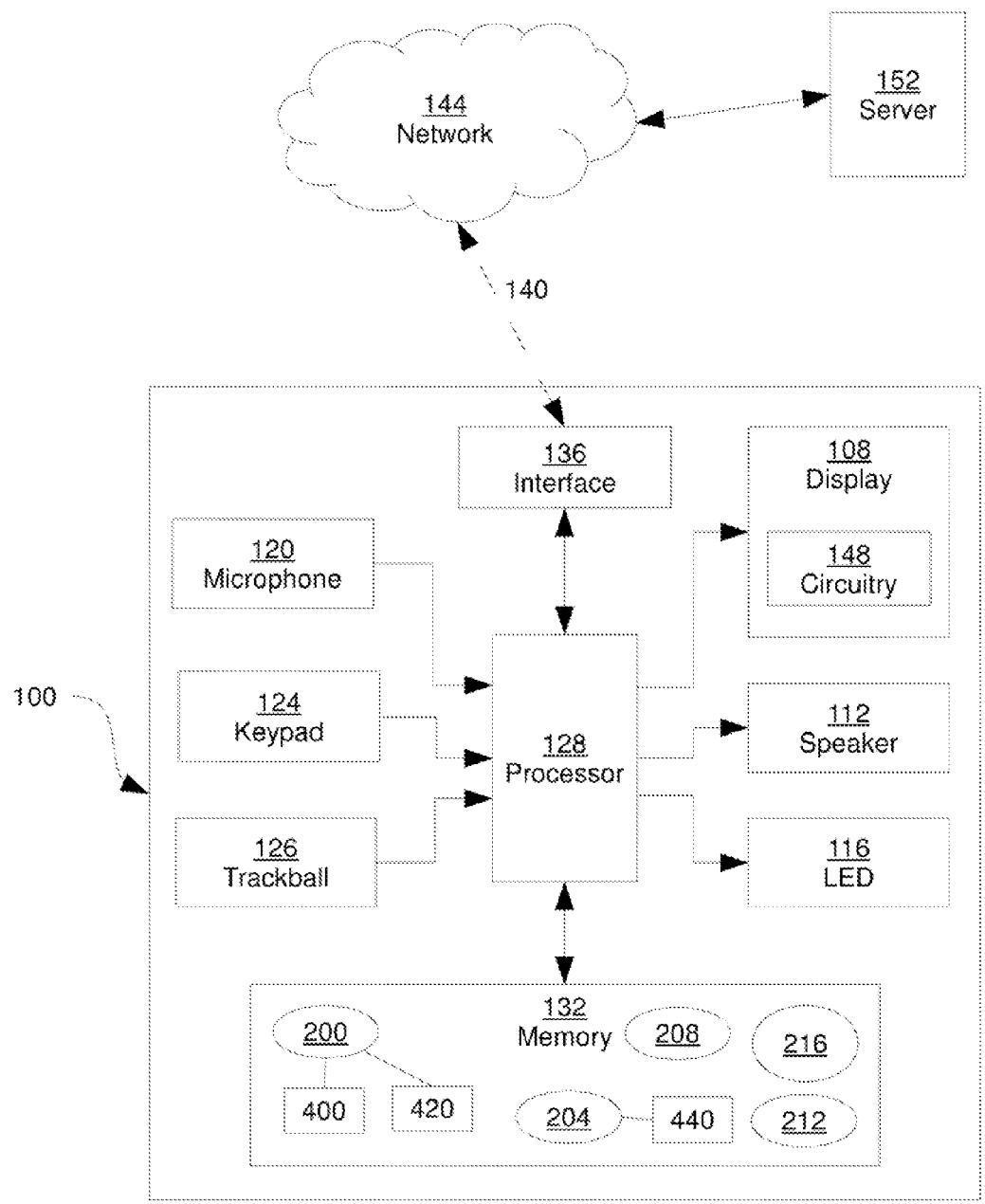
FIG. 2 depicts certain internal components of the mobile electronic device of FIG. 1, according to a non-limiting embodiment.

Referring now to FIG. 2, certain internal components of mobile electronic device 100 are shown. In addition to display 108, speaker 112, LED 116 and microphone 120, keypad 124 and trackball 126 are shown, as well as a processor 128 interconnected with a non-transitory computer readable storage medium in the form of a memory 132. Memory 132 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic storage device) memory.

Mobile electronic device 100 also includes a communications interface 136 interconnected with processor 128. Communications interface 136 allows mobile electronic device 100 to communicate with other devices via, for example, a link 140 and a network 144. Such other devices can include, for example, a provisioning server 152. It is also contemplated that other devices can include other servers as well as mobile electronic devices.

Network 144 can include any suitable combination of wired networks and wireless networks. Network 144 can thus include networks including but not limited to a Wide Area Network ("WAN") such as the Internet, a Local Area Network ("LAN"), cell phone networks, WiFi networks, WiMax networks and the like. Link 140 is compatible with network 144.

In particular, link 140 can be a wireless link based on Global System for Mobile communications ("GSM"), General Packet Radio. Service ("GPRS"), Enhanced Data rates for GSM Evolution ("EDGE"), and the third-generation mobile communication system (3G), Institute of Electrical and Electronic Engineers ("IEEE") 802.11 (WiFi) or other wireless protocols. Link 140 can also include any base stations and backhaul links necessary to connect mobile electronic device 100 to network 144. Communications interface 136 is therefore selected for compatibility with link 140 as well as with network 144. In some embodiments, network 144 can be omitted, and link 140 can be a short-range wireless link such as a Bluetooth™ link and the like. In still other embodiments, link 140 can be a short-range wired link, such as a Universal Serial Bus ("USB") link.

As also seen in FIG. 2, display 108 includes display circuitry 148 controllable by processor 128. Display 108 includes a flat panel display (e.g. Liquid Crystal Display (LCD), plasma display, Organic Light Emitting Diode (OLED) display). Circuitry 148 thus includes any suitable combination of display buffers, transistors, LCD cells, plasma cells, phosphors, and the like. In general, circuitry 148 of display 108 is controllable by processor 128 to generate interfaces on display 108. The interfaces comprise representations of data stored in memory 132. For example, such interfaces can include representations of various applications maintained by mobile electronic device 100.

The various components of mobile electronic device 100 are interconnected, for example via a communication bus. Mobile electronic device 100 is powered by a battery (not shown). In some non-limiting embodiments, mobile electronic device 100 can be supplied, in addition to or instead of the battery, with electricity by a wired connection to a wall outlet or other power source.

Still referring to FIG. 2, mobile electronic device 100 stores, in memory 132, a plurality of applications. Each application comprises computer-readable instructions for execution by processor 128. It is contemplated that one or more of such applications can also be stored in other non-transitory computer-readable media, such as memories external to mobile electronic device 100 (for instance, in provisioning server 152), compact discs, digital video discs and the like.

In the present example embodiment, memory 132 stores a wallet application 200 (that is, an application for managing the storage of login credentials, payment information and the like), a messaging application 204, a calendar application 208 and an address book application 212. In other embodiments, a wide variety of other applications are also possible in addition to, or instead of, the above-mentioned applications. Mobile electronic device 100 also maintains in memory 132 an operating system ("OS") 216, which comprises computer-readable instructions executable by processor 128. Processor 128, via execution of OS 204, can be enabled to execute other ones of the applications in memory 132 and to manage the computing resources of mobile electronic device 100. Processor 128 can thus be configured to carry out various functions via execution of the computer-readable instructions of OS 216 and applications 200, 204, 208 and 212. Among the functions carried out by processor 128 is the controlling of display 108 to generate representations of application identifiers, as will be discussed below in greater detail.

Figure 3:
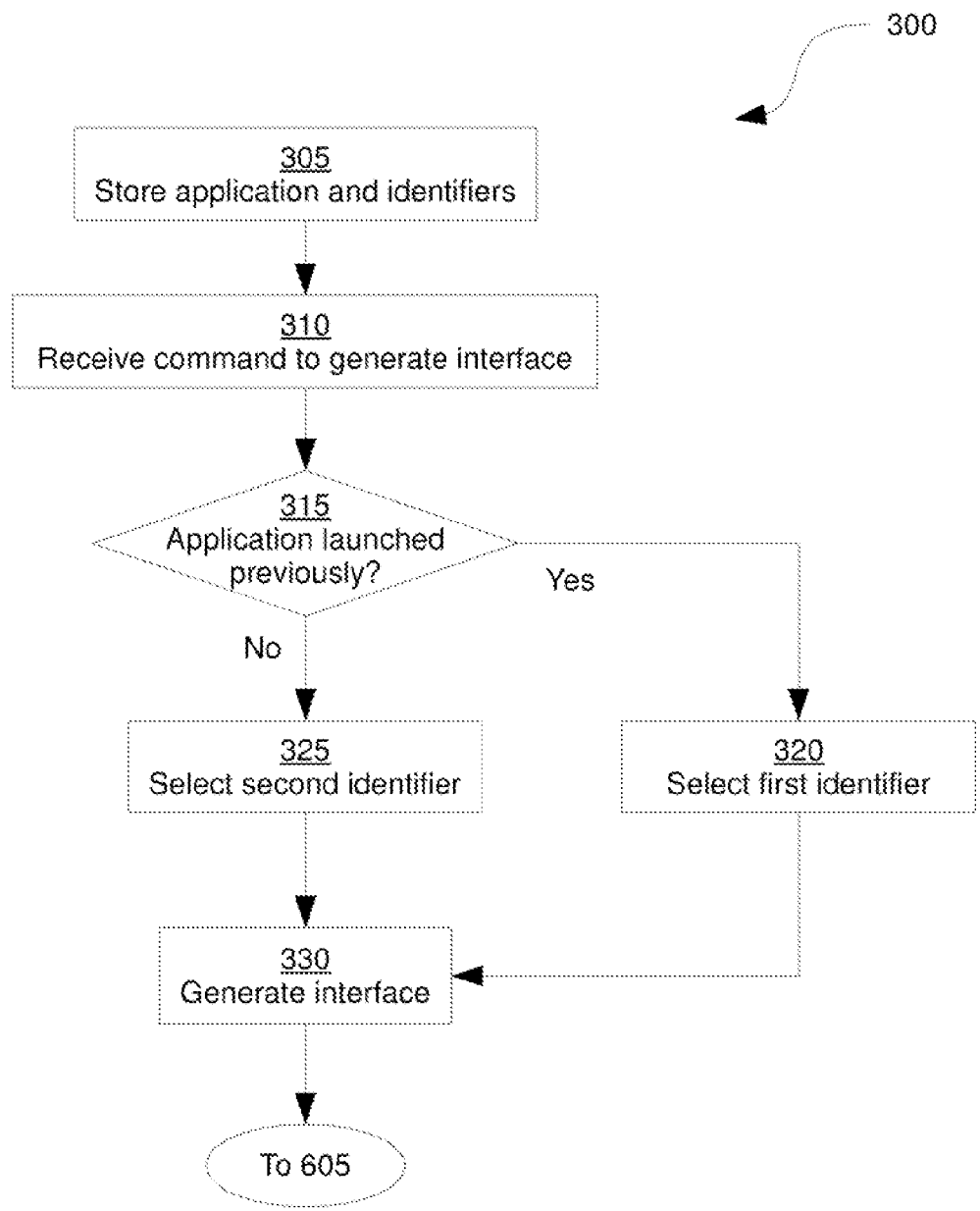
FIG. 3 depicts a method of controlling a display of the mobile electronic device of FIG. 1, according to a non-limiting embodiment.

Referring now to FIG. 3, a method 300 of controlling a display of a mobile electronic device is depicted. Method 300 will be described in connection with its performance on mobile electronic device 100, though it will be appreciated that method 300 can also be performed on any other suitable device.

Performance of method 300 begins at block 305, at which processor 128 is configured to maintain (i.e. store) a first application in memory 132, and to maintain first and second identifiers in memory 132 in association with the first application. The first application can be, for example, any of the applications 200, 204, 208 and 212 described earlier. It is contemplated that the first application can also be any one of a wide variety of applications. In the present example performance of method 300, the first application is wallet application 200.

Figure 4:
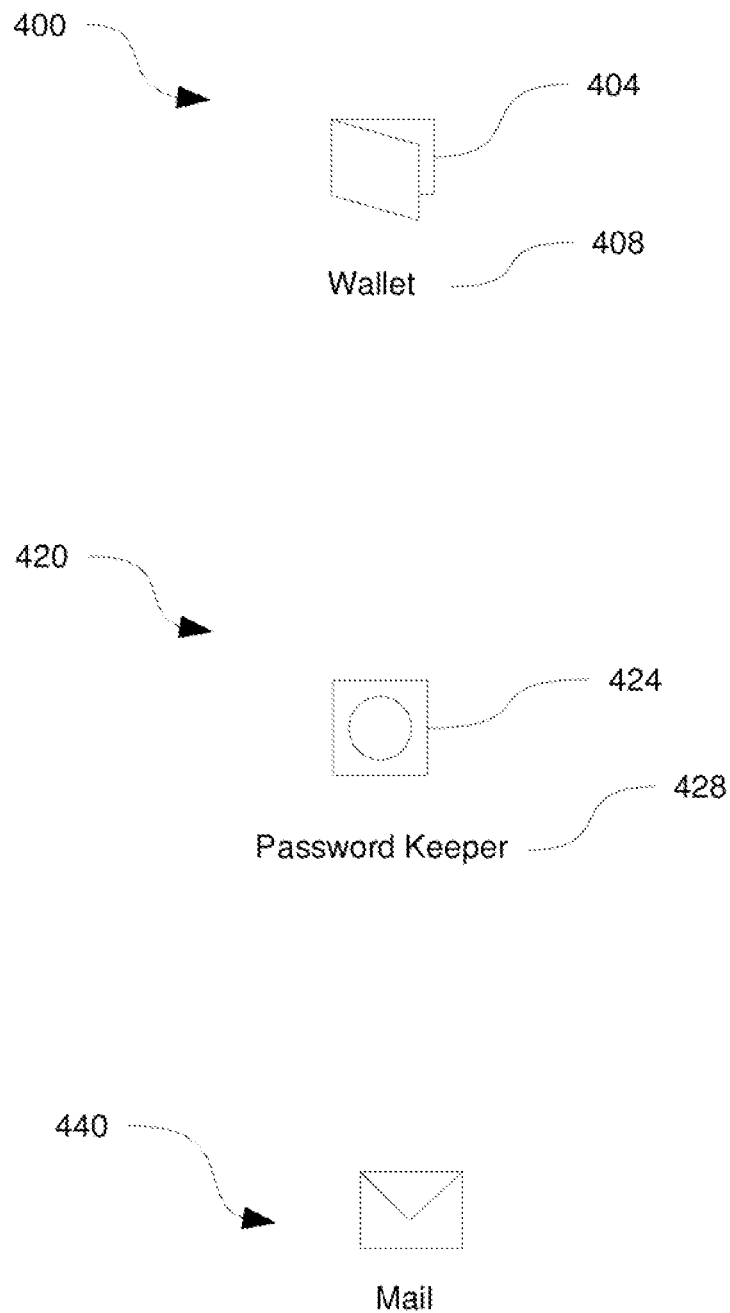
FIG. 4 depicts application identifiers stored by the mobile electronic device of claim 1, according to a non-limiting embodiment.

The first identifier comprises data identifying wallet application 200 (that is, the first application). Turning to FIG. 4, an example wallet application identifier 400 is shown. Wallet application identifier 400 includes an icon or other image component 404 and a label 408. It is contemplated that a wide variety of identifiers can be used in place of identifier 400. For example, either one of icon 404 and label 408 can be omitted. In general, identifier 400 provides sufficient information to identify wallet application 200 from other applications.

The second identifier comprises data identifying a second application different from wallet application 200. Further, it is contemplated that in the present example embodiment, the second application is not present on mobile electronic device 100 (that is, the second application is not in memory 132). The second application is related to wallet application 200 in that wallet application 200 is a replacement for the second application. In other words, the functionality provided by wallet application 200 when executing on processor 128 can be a superset of the functionality that would be provided by the second application, thus rendering the second application redundant. In other embodiments, the second application can be an earlier version of wallet application 200. In still other embodiments, wallet application 200 can be a replacement for the second application even if the functionality of wallet application 200 is not a complete superset of the functionality of the second application (that is, some features may not be provided by wallet application 200).

In the present example performance of method 300, the second application, is a password keeper application which manages the storage of login credentials. Thus, the functionality of wallet application 200 includes the functionality of the password keeper application (i.e. is a superset of the functionality of the password keeper application), and wallet application 200 is thus a replacement for the password keeper application.

Still referring to FIG. 4, a second identifier 420 is shown. Second identifier 420 includes an icon or other image component 424 and a label 428. In general identifier 420 identifies the password keeper application.

The mechanism of arrival of wallet application 200, first identifier 400 and second identifier 420 in memory 132 is not particularly limited. For example, wallet application 200 can be received at mobile electronic device 100 from provisioning server 152 via network 144 and link 140. In other embodiments, wallet application 200 and the first and second identifiers 400 and 420 can be pre-loaded on mobile electronic device 100 prior to purchase by a subscriber. In some embodiments, the storing of wallet application 200 can result in the removal from memory of the password keeper application. In other embodiments, the password keeper application was never stored in memory (for example, in the pre-loading case mentioned above).

As a further example, FIG. 4 also shows an identifier 440 for messaging application 204.

Referring briefly to FIG. 2, identifiers 400 and 420 are shown in memory 132 in association with wallet application 200. It is contemplated that in other embodiments, identifiers 400 and 420 can be incorporated within the computer-readable instructions making up wallet application 200. Similarly, identifier 440 is shown stored in association with messaging application 204.

Returning to FIG. 3, method 300 proceeds to block 310. At block 310, processor 128 is configured to receive a command to generate an application launch interface (also referred to herein as a launch interface) on display 108. The launch interface, as will be discussed in greater detail below, presents various application identifiers for selection. Receipt of input data at processor 128 representative of selection of an identifier causes processor 128 to launch the application identified by the selected identifier.

The command received at block 310 can be received by way of input data from an input device such as keypad 124, trackball 126, a touch screen, a track pad, or any combination thereof. In other embodiments, the command received at block 310 is received from processor 128 itself executing OS 216. For example, the "default" or "home" interface of mobile electronic device 100 can be the launch interface. Thus, upon device start-up, or upon ending execution of another application, processor 128 can be configured to generate the launch interface.

Proceeding to block 315, processor 128 is configured to determine whether wallet application 200 has been launched—in other words, whether processor 128 has been caused to execute the computer-readable instructions of wallet application 200—previously. The determination at block 315 can be performed in a variety of ways. In the present example performance of method 300, a flag or other indicator is stored in memory 132 in association with wallet application 200. The flag is a '1' when wallet application 200 has been launched previously, and a '0' when wallet application 200 has not been launched previously (i.e. when wallet application 200 has never been launched on mobile electronic device 100). Flags other than '0' and '1' can also be used. For example, the flag can be a representation of the date of wallet application 200's last launch. Thus, if the flag is empty, processor 128 can determine that wallet application 200 has never been launched. It is contemplated that in some embodiments, the flag can be reset to indicate that wallet application 200 has not been launched previously even when wallet application 200 has in fact been launched. For example, if mobile electronic device 100 is changing ownership, the flag can be reset such that wallet application 200 is considered never to have been launched under the new ownership.

In further embodiments, the flag can be explicitly set, by way of input data received at processor 128, to indicate that wallet application 200 has been launched previously even when wallet application 200 has not in fact been launched. In such further embodiments, the flag can also be set in this manner automatically by processor 128 following an affirmative determination performed by processor 128. Such a determination can be, for example, that the password keeper application has never been installed on mobile electronic device 100, or alternatively, that the password keeper application has never been used. Processor 128 can be configured to determine that the password keeper application has never been used by examining memory 132 to determine if any data (such as passwords, account identifiers and the like) is stored therein in association with the password keeper application. If no such data is stored in memory 132, processor 128 can determine that the password keeper application, although installed, was never used.

Thus, in the performance of block 315, processor 128 is configured, via execution of OS 216, to determine the value of the flag stored in association with wallet application 200. If the flag indicates that wallet application has been launched previously at least once, then method 300 proceeds to block 320. If, on the other hand, the flag indicates that wallet application 200 has never been launched, then method 300 proceeds to block 325.

It is contemplated that when wallet application 200 is first provided in memory 132 (i.e. at installation), the flag described above is set to '0'. As will be discussed below in further detail, the initial value of '0' for the flag can be changed during execution of method 300.

It is also contemplated that in other embodiments, the determination at block 315 can take other forms. For example, in some embodiments, a flag similar to that described above can be maintained in memory 132 in association with one of identifiers 400 and 420, indicating that that identifier is the "active" identifier. When wallet application 200 is first provided in memory 132, identifier 420 can be flagged as the active identifier. Thus, processor 128 can determine whether wallet application has been launched indirectly, by determining which identifier is flagged as active. As will be discussed in greater detail below, identifier 420 is flagged as active when wallet application has not been launched previously (hence the flagging of identifier 420 at the installation of wallet application 200).

In still other embodiments, processor 128 can be configured to maintain a counter in memory 132 of the number of times wallet application 200 has been launched. The performance of block 315 in such embodiments would thus consist of consulting the counter, and proceeding to block 320 if the value stored therein was higher than zero, or proceeding to block 325 if the value stored therein was equal to zero.

Returning to the performance of block 315, if the determination at block 315 is affirmative—that is, when wallet application 200 has been launched previously—the performance of method 300 proceeds to block 320, where first identifier 400 is selected instead of second identifier 420. Performance of method 300 then proceeds to block 330, which will be discussed below. In the present example performance of method 300, it will be assumed that the flag stored in association with wallet application 200 is '0'. Thus, the determination at block 315 is negative, and performance of method 300 proceeds to block 325.

At block 325, processor 128 is configured to select second identifier 420 instead of first identifier 400 and proceed to block 330. Selection of second identifier 420 can include, for example, retrieving of second identifier 420 from memory 132 and storing a copy of second identifier 420 in an area of memory 132 designated for temporary use. In other embodiments, a point or other indicator referring to second identifier 420 can be stored in the temporary area.

At block 330, processor 128 is configured to control circuitry 148 of display 108 to generate a launch interface. Generation of the launch interface includes the retrieval of second identifier 420 (or of the above-mentioned copy of second identifier 420, as applicable) from memory 132, as well as identifiers for other applications, and the transmittal of such identifiers, reformatted as necessary, to circuitry 148.

Figure 5:
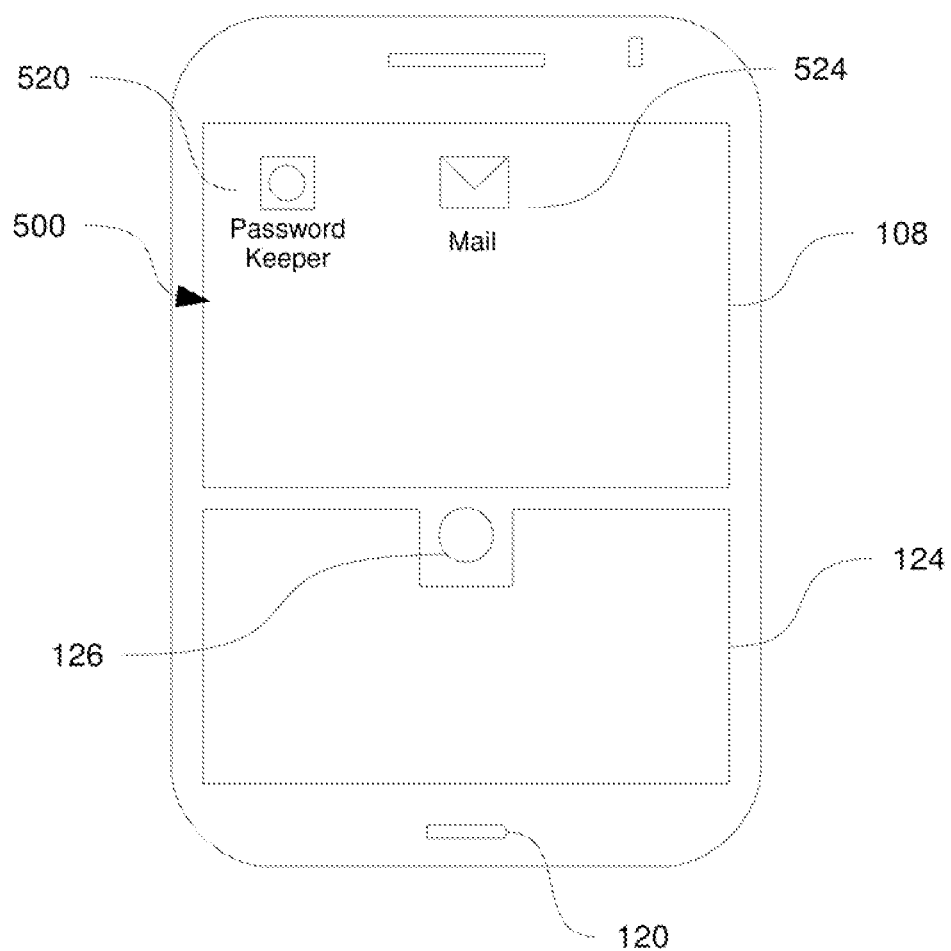
FIG. 5 depicts an application launch interface generated by the mobile electronic device of FIG. 1, according to a non-limiting embodiment.

Turning to FIG. 5, an example launch interface 500 is shown on display 108. Launch interface 500 includes representations of application identifiers, including a representation 520 of second identifier 420. By way of example, a representation 524 of an identifier for messaging application 204 is also included in interface 500. It is contemplated that representations of other identifiers can also be included. Performance of block 330 would thus include the retrieval of those identifiers from memory 132.

In general, and as will be discussed in greater detail below, each representation 520, 524 of interface 500 is selectable for causing processor 128 to launch the application with which the identifier is associated in memory 132. Representation 520, however, is selectable for causing processor 128 to launch wallet application 200 as opposed to the password keeper application, which does not reside in memory 132. It will now be apparent that if the determination at block 315 were affirmative, first identifier 400 would be selected instead of second identifier 420, and launch interface 500 would include a representation of first identifier 400 instead of representation 520.

Figure 6:
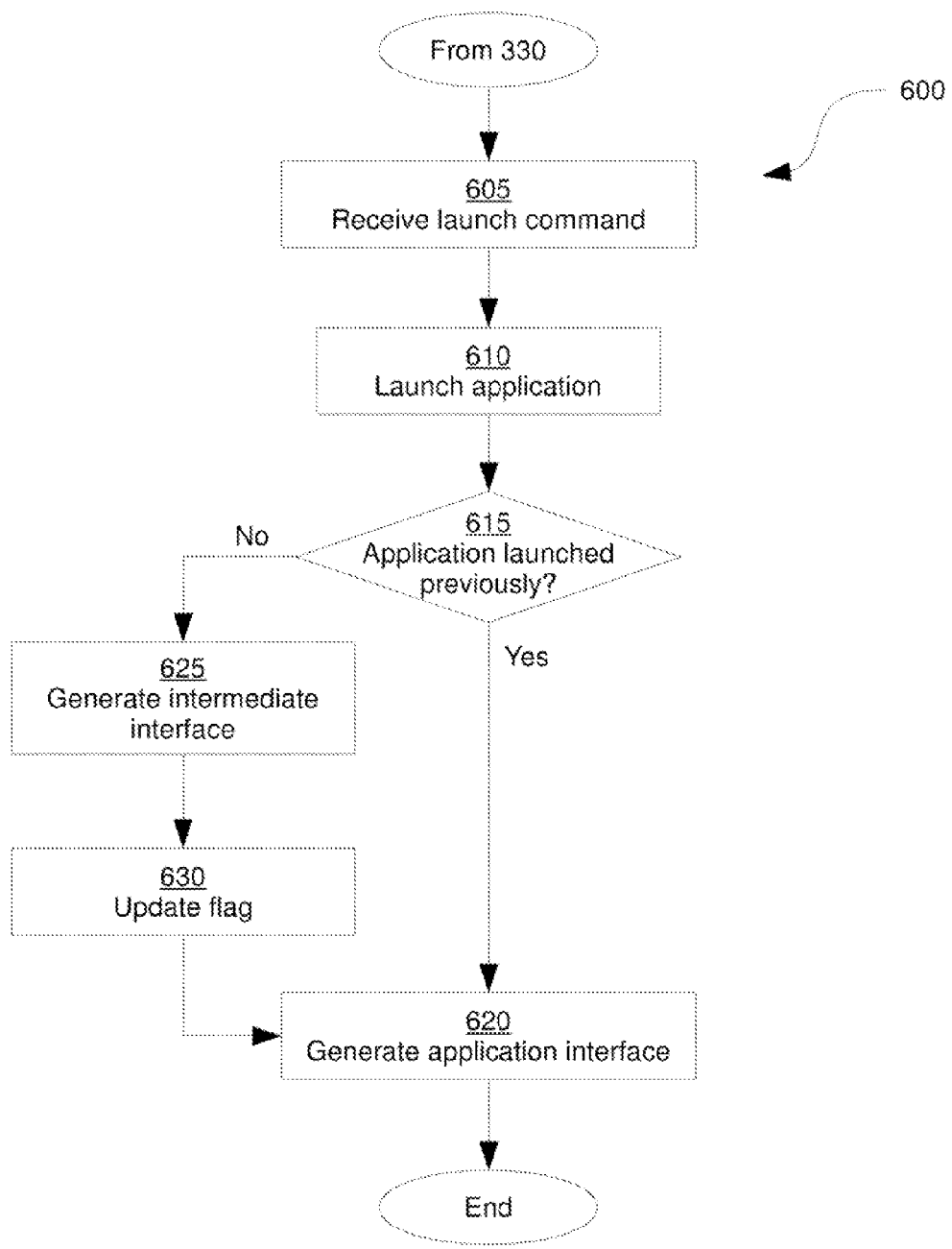
FIG. 6 depicts a further method of controlling a display of the mobile electronic device of FIG. 1, according to a non-limiting embodiment.

As shown in FIG. 3, following the generation of interface 500, the performance of method 300 can proceed to block 605, shown in FIG. 6. In other embodiments, the performance of method 300 can end, however.

FIG. 6 depicts a method 600 of controlling a display of a mobile electronic device. Method 600, as with method 300, will be described in connection with its performance on mobile electronic device, though it will be appreciated that method 600 can also be performed on any other suitable device.

As mentioned above, method 600 can follow the performance of method 300. Thus, following the generation of interface 500, at block 605 processor 128, via execution of OS 216, can be configured to receive a launch command. A launch command is received in the form of input data from an input device, such as trackball 126, keypad 124, a touch screen, a track pad or any combination thereof, indicating selection of a representation from interface 500. In the present example performance of method 600, it will be assumed that processor 128 receives input data representative of a selection of representation 520 by trackball 126.

Proceeding to block 610, processor 128 is configured to launch wallet application 200 in response to the launch command received at block 605. Launching wallet application 200 comprises retrieving the computer-readable instructions of wallet application 200 from memory 132 and executing those instructions.

Proceeding to block 615, processor 128, via execution of wallet application 200, is configured to determine whether wallet application 200 has been launched previously (that is, previously to the launch at block 610). The determination at block 615 is as described above at block 315. Indeed, in some embodiments, the results of the determination at block 315 can be stored temporarily in memory 132 for use at block 615. For example, processor 128 can be configured to determine which identifier was selected to represent wallet application 200 in launch interface 500.

If the determination made at block 615 is affirmative (i.e. wallet application 200 is determined to have been launched at least once prior to the present execution of wallet application 200), performance of method 600 proceeds to block 620, at which processor 128 is configured to control display 108 to generate an application interface for wallet application 200. Such an application interface can take a variety of forms, and includes representations of menus, options, images and the like which are selectable to activate the various functionalities of wallet application 200.

In the present example, however, it will be assumed that the performance of method 600 follows the example performance of method 300 described above. Thus, wallet application 200 has not been launched previously and the determination at block 615 is negative. Performance of method 600 thus proceeds to block 625.

Figure 7:
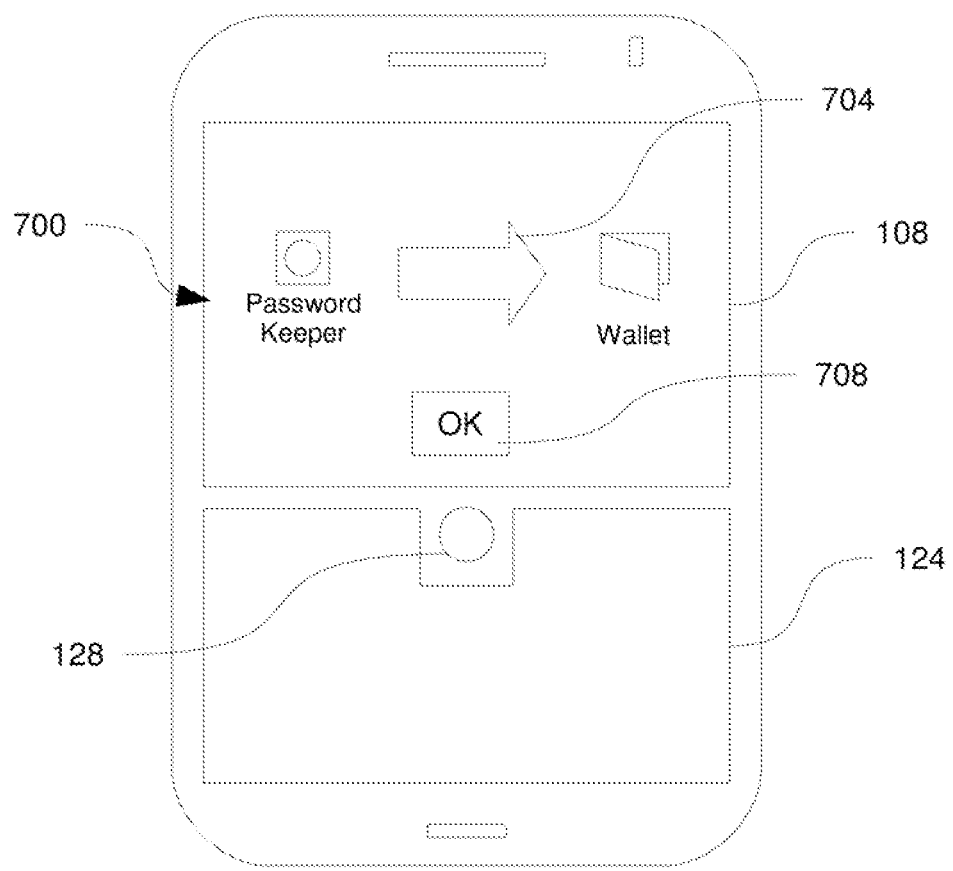
FIG. 7 depicts an intermediate interface generated by the mobile electronic device of FIG. 1, according to a non-limiting embodiment.

At block 625, processor 128 is configured, via execution of wallet application 200, to control display 108 for generating an intermediate interface. Turning now to FIG. 7, an example intermediate interface 700 is shown. Intermediate interface 700 includes representations of both first and second identifiers 400 and 420, as well as a representation 704 of data identifying the relationship between identifiers 400 and 420. In the example intermediate interface shown in FIG. 7, the representation 704 is of an arrow indicating that identifier 420 will subsequently be replaced by identifier 400. In other words, the arrow indicates that wallet application 200 has replaced the password keeper application that may have previously been resident in memory 132, or that may have been resident in the memory of a different mobile electronic device (e.g. an earlier model).

A wide variety of data can be used for representation 704, instead of or in addition to the arrow shown in FIG. 7. In general, it is contemplated that representation 704 is of any data which provides an indication that wallet application 200 has replaced the password keeper application and that wallet application 200 will be launching instead of the password keeper application. For example, the arrow can be replaced with a block of text which describes the replacement of the password keeper application by wallet application 200. In other embodiments, both the text and the arrow can be represented.

Returning to FIG. 6, it will now be apparent that the performance of block 625 includes retrieving the necessary data from memory 132 (i.e. identifiers 400 and 420 and the indicator data for representation 704).

Following the performance of block 625, performance of method 600 proceeds to block 630, at which processor 128 is configured to update the flag indicating whether wallet application 200 has been launched previously. In particular, processor 128 is configured to set the flag to a value which indicates that wallet application 200 has been previously launched (e.g., '1'). Block 630 can be performed upon selection of the 'OK' option shown in FIG. 7, or after a configurable period of time has elapsed since the generation of the intermediate interface.

Following the performance of block 630, processor 128 is configured to generate the application interface at block 620, as described above.

It is contemplated that in some embodiments, at block 630, processor 128 can be configured to delete second identifier 420. In some embodiments in which such deletion is practiced, the flag for indicating whether wallet application 200 has been launched previously can also be deleted. The determinations made during subsequent performances of block 315 and 615 can then be affirmative on the basis that the flag cannot be located.

It will now be apparent that following the performance of method 600 when wallet application 200 has not been launched previously, subsequent performances of methods 300 and 600 will result in first identifier 400 being displayed in launch interface 500, and in the generation of an intermediate interface being bypassed. In other words, the replacement of the password keeper application by wallet application 200 can be considered "complete".

Figure 8:
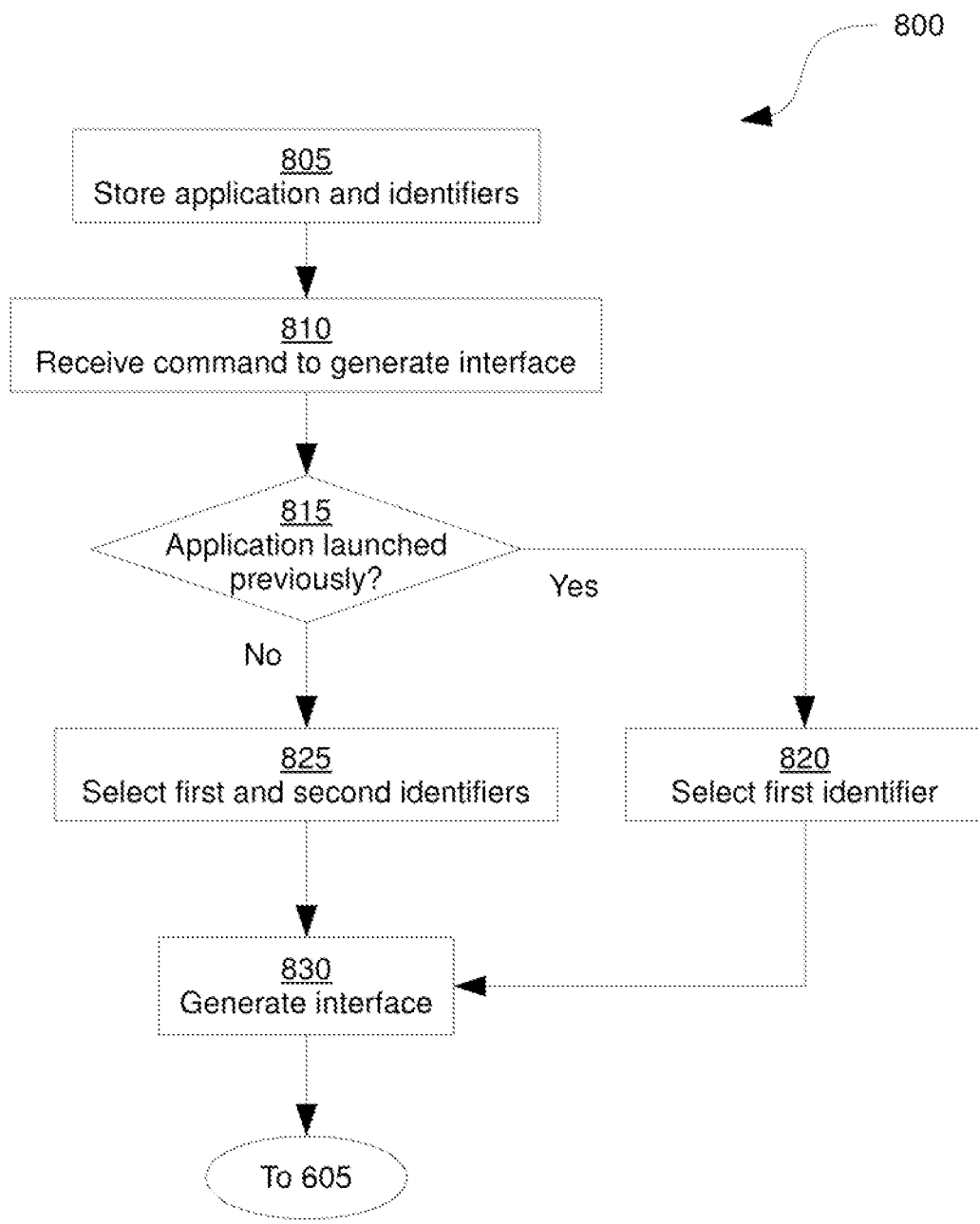
FIG. 8 depicts a method of controlling a display of the mobile electronic device of FIG. 1, according to another non-limiting embodiment.

Referring now to FIG. 8, a further method 800 of controlling a display of a mobile electronic device is depicted. Method 800 will be described in connection with its performance on mobile electronic device, though it will be appreciated that method 800 can also be performed on any other suitable device.

Figure 9:
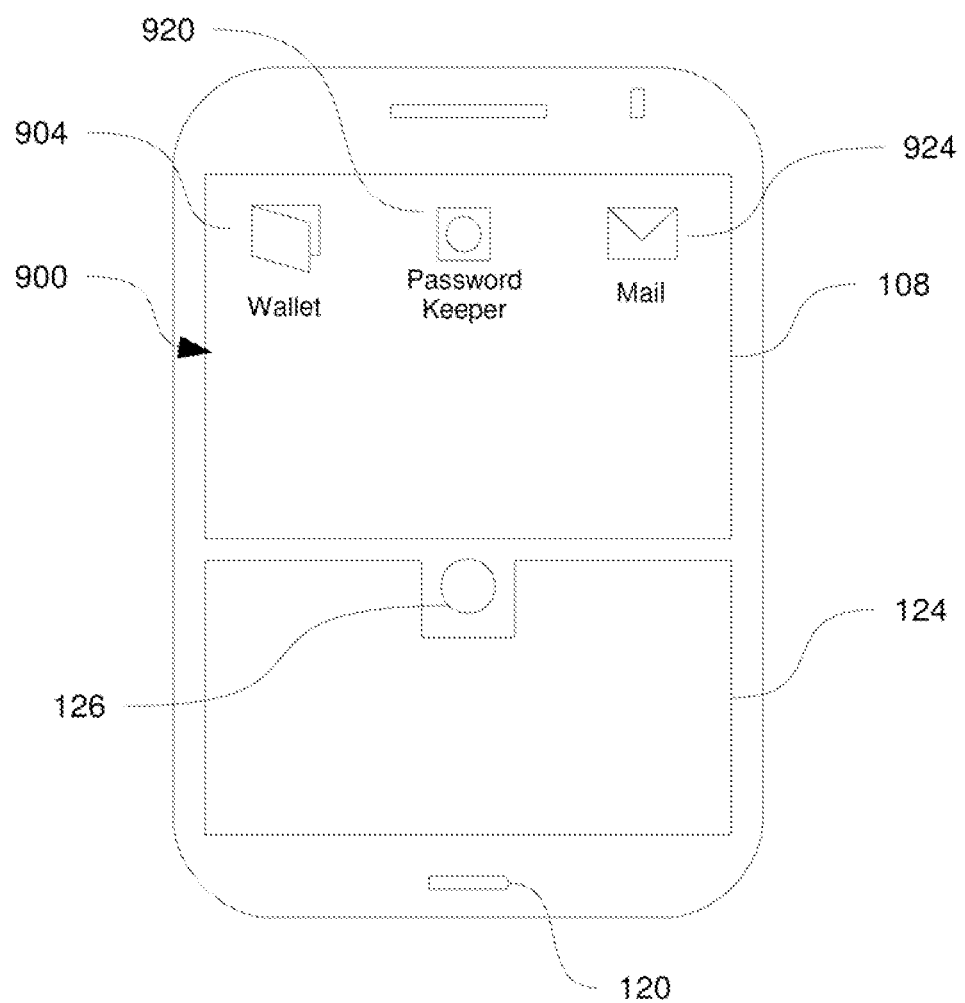
FIG. 9 depicts an application launch interface generated by the mobile electronic device of FIG. 1, according to another non-limiting embodiment.

The performance of blocks 805, 810, 815, 820 and 830 are as described above in connection with blocks 305, 310, 315, 320 and 330 of method 300, respectively. At block 825, however, processor 128 is configured, following a negative determination at block 815, to select both first and second identifiers 400 and 420 rather than only one of the identifiers. Thus, at block 830, processor 128 is configured to control display 108 to generate a launch interface which includes representations of both identifiers 400 and 420. Referring to FIG. 9, an example of such a launch interface 900 is shown. Launch interface 900 includes a representation 904 of first identifier 400, a representation 920 of second identifier 420, and a representation 924 of identifier 440. It is contemplated that selection of either one of representations 904 and 920 results in the receipt of a launch command (see block 605, above) by processor 128 for wallet application 200.

Thus, prior to the first launch of wallet application 200, the performance of method 800 results in the generation of a launch interface comprising both the first and second identifiers 400 and 420. After the first launch of wallet application 200, performance of method 800 results in the generation of a launch interface comprising only first identifier 400. It is contemplated that the use of the term "only" in connection with identifiers 400 and 420 relates only to those identifiers. Other application identifiers, such as identifier 440, can still be provided in launch interfaces and are not affected by the performance of methods 300 and 800.

Certain advantages will now occur to those skilled in the art. For example, the display of second identifier 420 instead of first identifier 400 to identify wallet application 200 can result in reduced strain on mobile electronic device 100. When wallet application 200 has replaced the password keeper application (whether or mobile electronic device 100 or in a broader context where the password keeper application was used on other devices), the display of second identifier 420 prior to the first launch of wallet application 200, and the generation of an intermediate interface visually indicating the link between the identifiers, can pre-empt attempts to unnecessarily locate or download the password keeper application, which would consume bandwidth, computing time and battery power. Other advantages will also occur to those skilled in the art.

Those skilled in the art will appreciate that in some embodiments, the functionality of applications 200, 204, 208 and 212 as well as OS 216 can be implemented using pre-programmed hardware or firmware elements (e.g., application specific integrated circuits (ASICs), electrically erasable programmable read-only memories (EEPROMs), etc.), or other related components.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A mobile electronic device, comprising:
a display;
a memory for storing a first application, a first identifier identifying the first application and a second identifier for identifying a second application, the second identifier stored in association with the first application; and,
a processor interconnected with the display and the memory, the processor configured to control the display to generate a launch interface comprising a representation of the second identifier for launching the first application without launching the second application.

2. The mobile electronic device of claim 1, the processor being further configured, prior to generating the launch interface, to determine that the first application has not been launched previously.

3. The mobile electronic device of claim 2, the processor being further configured to determine that the first application has not been launched previously by inspecting a flag maintained in memory in association with the first application.

4. The mobile electronic device of claim 3, the processor being further configured, following generation of the launch interface, to receive input data representative of a selection of the second identifier, and to launch the first application in response to receiving the input data.

5. The mobile electronic device of claim 4, the processor being further configured to generate an intermediate interface comprising representations of each of the first and second identifiers.

6. The mobile electronic device of claim 5, the processor being further configured to update the flag following generation of the intermediate interface.

7. The mobile electronic device of claim 6, the processor being further configured, subsequent to updating the flag, to generate an application interface for the first application.

8. The mobile electronic device of claim 1, wherein the functionality of the first application is a superset of the functionality of the second application.

9. The mobile electronic device of claim 1, wherein the launch interface further comprises a representation of the first identifier for launching the first application.

10. A method of controlling a display of a mobile electronic device, the method comprising:
storing, in a memory of the mobile electronic device, a first application, a first identifier identifying the first application and a second identifier for identifying a second application, the second identifier stored in association with the first application; and,
controlling the display to generate a launch interface comprising a representation of the second identifier for launching the first application without launching the second application.

11. The method of claim 10, further comprising:
prior to generating the launch interface, determining that the first application has not been launched previously.

12. The method of claim 11, wherein determining that the first application has not been launched previously comprises inspecting a flag maintained in memory in association with the first application.

13. The method of claim 12, further comprising:
following generation of the launch interface, receiving input data representative of a selection of the second identifier; and
launching the first application in response to receiving the input data.

14. The method of claim 13, further comprising:
controlling the display to generate an intermediate interface comprising representations of each of the first and second identifiers.

15. The method of claim 14, further comprising:
updating the flag following generation of the intermediate interface.

16. The method of claim 15, further comprising:
subsequent to updating the flag, controlling the display to generate an application interface for the first application.

17. The method of claim 10, wherein the functionality of the first application is a superset of the functionality of the second application.

18. The method of claim 10, wherein the launch interface further comprises a representation of the first identifier for launching the first application.

19. A non-transitory computer-readable medium for storing computer-readable instructions executable by a processor, the computer-readable instructions implementing a method comprising:
- storing, in a memory of the mobile electronic device, a first application, a first identifier identifying the first application and a second identifier for identifying a second application, the second identifier stored in association with the first application;
- controlling a display of the mobile electronic device to generate a launch interface comprising a representation of the second identifier for launching the first application without launching the second application.

* * * * *